US00RE37340B1

(19) United States
(12) Reissued Patent
King, Jr.

(10) Patent Number: US RE37,340 E
(45) Date of Reissued Patent: Aug. 28, 2001

(54) WIRE JUNCTION ENCAPSULATING WIRE CONNECTOR AND METHOD OF MAKING SAME

(75) Inventor: Lloyd Herbert King, Jr., Town & Country, MO (US)

(73) Assignee: King Technology of Missouri, Inc., St. Louis, MO (US)

(21) Appl. No.: 08/893,956

(22) Filed: Jul. 16, 1997

Related U.S. Patent Documents

Reissue of:
(64) Patent No.: 5,151,239
Issued: Sep. 29, 1992
Appl. No.: 08/673,792
Filed: Mar. 22, 1991

U.S. Applications:
(63) Continuation of application No. 08/421,510, filed on Apr. 11, 1995, now abandoned, which is a continuation of application No. 08/001,137, filed on Jan. 6, 1993, now abandoned, which is a continuation-in-part of application No. 07/574,808, filed on Aug. 30, 1990, now Pat. No. 5,113,037, which is a continuation-in-part of application No. 07/478,687, filed on Feb. 12, 1990, now Pat. No. 5,023,402, which is a continuation-in-part of application No. 07/450,156, filed on Dec. 13, 1989, now abandoned.

(51) Int. Cl.[7] ..... H01R 4/00
(52) U.S. Cl. ..... 174/87; 264/274; 264/295; 264/296; 264/272.11; 264/271.1; 264/254; 264/272.13; 174/87; 29/858
(58) Field of Search ..... 264/274, 295, 264/296, 272.11, 271.1, 254, 272.13; 174/87; 29/858

(56) References Cited

U.S. PATENT DOCUMENTS

| | | | |
|---|---|---|---|
| Re. 34,522 | 1/1994 | Wallace | 427/510 |
| D. 191,399 | 9/1961 | Leach | D261/1 |
| 997,066 | 7/1911 | Krannichfeldt . | |

(List continued on next page.)

FOREIGN PATENT DOCUMENTS

| | | |
|---|---|---|
| 0108518 | 8/1985 | (EP) . |
| 0 203 253 | 1/1986 | (EP) . |
| 0203253 | 1/1986 | (EP) . |

(List continued on next page.)

OTHER PUBLICATIONS

Ideal Industries drawing K–4326 on NOALOX (1 Page) from Mar. 19, 1968.
Ideal Industries instructions on Wing–Nut® wire connector.
"The Influence of Corrosion Inhibitor and Surface Abrasion on the Failure of Aluminum–Wired Twist–On Connectors" Aronstein and Campbell, *IEEE Transactions on Components, Hybrids, and Manufacturing Technology* vol. CHMT—, No. 1, Mar. 1984; pp. 20–24.
The sheet identified by Standard for Splicing Wire Connectors—UL 486C, First Edition—Dec., 1983 Second Edition Oct. 9, 1991—Copyright by Underwriters Laboratories, Inc.

(List continued on next page.)

*Primary Examiner*—Angela Ortiz
(74) *Attorney, Agent, or Firm*—Jacobson & Johnson

(57) ABSTRACT

A solderless twist on wire connector and a method of making a solderless twist on wire junction encapsulating twist on wire connector by securing a prior art twist on wire connector in a shell to produce a wire junction encapsulating twist on wire connector that can in one operation permit the user to twist the connector to simultaneously compress the junction ends of electrical wires into low resistance electrical contact while encapsulating the junction ends of the electrical wires in a solderless substance. The process includes the method making a twist on wire connector by encapsulating a prior art twist on wire connector in a shell to produce a wire junction encapsulating twist on wire connector having a chamber for an encapsulating material. In one embodiment the twist on wire junction encapsulating twist on wire connector includes a puncturable seal and in another embodiment a second compartment for holding a mixable encapsulating materials.

37 Claims, 9 Drawing Sheets

U.S. PATENT DOCUMENTS

| | | | |
|---|---|---|---|
| 1,297,614 | 3/1919 | Van Viersen | 174/87 |
| 1,419,523 | 6/1922 | Schleper . | |
| 1,460,624 | 7/1923 | Van Gelderen . | |
| 1,577,123 | 3/1926 | Hunt . | |
| 1,700,985 | 2/1929 | Jasper . | |
| 1,896,322 | 2/1933 | Marr . | |
| 1,923,073 | 8/1933 | Brell | 174/87 |
| 2,416,943 | 3/1947 | Nicolazzo | 174/87 |
| 2,825,750 | 3/1958 | Stockwell | 174/87 |
| 2,870,239 | 1/1959 | Ustin | 174/87 |
| 2,877,288 | 3/1959 | Wayne | 174/92 |
| 2,910,525 | 10/1959 | Frank . | |
| 2,932,685 | 4/1960 | Raila et al. | 174/87 |
| 2,939,805 | 7/1960 | Johnson | 411/258 |
| 2,958,723 | 11/1960 | Logan et al. | 174/93 |
| 3,012,219 | 12/1961 | Levin et al. | 439/402 |
| 3,044,037 | 7/1962 | Honig . | |
| 3,061,455 | 10/1962 | Anthony | 427/409 |
| 3,083,260 | 3/1963 | Bird | 174/87 |
| 3,109,051 | 10/1963 | Vogel | 174/87 |
| 3,110,755 | 11/1963 | Esser . | |
| 3,156,762 | 11/1964 | Matthysse . | |
| 3,306,330 | 2/1967 | Wallace | 151/7 |
| 3,326,442 | 6/1967 | Fattor . | |
| 3,378,912 | 4/1968 | Wallace | 29/419 |
| 3,388,370 | 6/1968 | Elm | 439/402 |
| 3,418,840 | 12/1968 | Wallace | 73/1 |
| 3,440,333 | 4/1969 | Blomstrand . | |
| 3,478,800 | 11/1969 | Wallace | 151/7 |
| 3,483,310 | 12/1969 | Krup | 174/87 |
| 3,497,607 | 2/1970 | Swanson | 174/87 |
| 3,519,707 | 7/1970 | Krup . | |
| 3,530,704 | 9/1970 | Wallace | 73/1 |
| 3,550,765 | 12/1970 | Anderson | 174/87 |
| 3,558,800 | 1/1971 | Wallis et al. | 174/87 |
| 3,576,518 | 4/1971 | Bazille, Jr. | 439/402 |
| 3,597,528 | 8/1971 | Penfield et al. | 174/87 |
| 3,614,296 | 10/1971 | Blomstrand . | |
| 3,656,088 | 4/1972 | Seim | 439/402 |
| 3,716,653 | 2/1973 | Willmarth | 174/87 |
| 3,746,068 | 7/1973 | Deckert | 151/14.5 |
| 3,783,177 | 1/1974 | Kelso | 174/87 |
| 3,793,611 | 2/1974 | Johansson | 439/399 |
| 3,793,612 | 2/1974 | Driscoll | 439/402 |
| 3,858,157 | 12/1974 | Bazille, Jr. | 439/400 |
| 3,869,190 | 3/1975 | Bazille, Jr. | 439/400 |
| 3,875,324 | 4/1975 | Waddington et al. | 174/87 |
| 3,893,496 | 7/1975 | Wallace | 151/14.5 |
| 3,912,356 | 10/1975 | Johansson | 439/400 |
| 3,934,076 | 1/1976 | Smith | 174/87 |
| 3,937,870 | 2/1976 | Bumpstead et al. | 174/87 |
| 3,937,878 | 2/1976 | Bumpstead et al. . | |
| 3,950,579 | 4/1976 | Wallace | 427/379 |
| 3,985,951 | 10/1976 | Harris | 174/87 |
| 4,039,742 | 8/1977 | Smith | 174/87 |
| 4,053,704 | 10/1977 | Smith | 174/87 |
| 4,059,136 | 11/1977 | Wallace | 151/14.5 |
| 4,070,543 | 1/1978 | Thompson . | |
| 4,081,012 | 3/1978 | Wallace | 151/145 |
| 4,107,453 | 8/1978 | Erixon . | |
| 4,107,853 | 8/1978 | Erixon | 174/87 |
| 4,112,251 | 9/1978 | Scott . | |
| 4,220,811 | 9/1980 | Scott | 174/87 |
| 4,227,040 | 10/1980 | Scott | 174/87 |
| 4,241,878 | 12/1980 | Underwood | 264/274 |
| 4,262,038 | 4/1981 | Wallace | 427/181 |
| 4,268,544 | 5/1981 | Wallace | 427/264 |
| 4,279,943 | 7/1981 | Wallace | 427/57 |
| 4,285,378 | 8/1981 | Wallace | 411/258 |
| 4,295,004 | 10/1981 | Dauser, Jr. | 174/87 |
| 4,309,636 * | 1/1982 | Pollok | 264/272.11 |
| 4,314,094 | 2/1982 | Smith | 174/87 |
| 4,321,885 | 3/1982 | Wallace | 118/102 |
| 4,325,985 | 4/1982 | Wallace | 427/54.1 |
| 4,399,166 | 8/1983 | Wallace | 427/195 |
| 4,420,604 | 12/1983 | Wallace | 528/93 |
| 4,425,017 | 1/1984 | Chan . | |
| 4,428,981 | 1/1984 | Wallace | 427/195 |
| 4,428,982 | 1/1984 | Wallace | 427/202 |
| 4,446,332 | 5/1984 | Dauser, Jr. | 174/87 |
| 4,451,695 | 5/1984 | Fink . | |
| 4,491,686 | 1/1985 | Carsar | 174/87 |
| 4,501,041 | 2/1985 | Wallace | 10/86 |
| 4,508,759 | 4/1985 | Wallace | 427/195 |
| 4,531,016 | 7/1985 | Duve | 174/87 |
| 4,545,712 | 10/1985 | Wallace | 411/258 |
| 4,582,388 | 4/1986 | Swaffield . | |
| 4,686,272 | 8/1987 | Wallace | 528/87 |
| 4,686,326 | 8/1987 | Rich . | |
| 4,691,079 | 9/1987 | Blaha | 174/87 |
| 4,707,567 | 11/1987 | Blaha | 174/87 |
| 4,721,832 | 1/1988 | Toy | 174/87 |
| 4,751,350 | 6/1988 | Eaton | 174/87 |
| 4,764,579 | 8/1988 | Wallace | 528/87 |
| 4,803,779 | 2/1989 | Blaha | 29/878 |
| 4,847,113 | 7/1989 | Wallace | 427/54.1 |
| 4,891,244 | 1/1990 | Wallace | 427/195 |
| 5,000,636 | 3/1991 | Wallace | 411/258 |
| 5,140,746 * | 8/1992 | Debbaut | 29/858 |
| 5,315,066 * | 5/1994 | Spiteri, Sr. | 174/87 |

FOREIGN PATENT DOCUMENTS

| | | |
|---|---|---|
| 0267045 | 3/1990 | (EP) . |
| 2501926 | 3/1981 | (FR) . |
| 246327 | 1/1926 | (GB) . |
| 1429715 | 3/1976 | (GB) . |
| 0107601 | 10/1943 | (NL) . |
| 56183 | 4/1944 | (NL) . |

OTHER PUBLICATIONS

Advertising Sheet for Ideal No. IDL 000329, titled Wire Connector Accessories, dated 1980, featuring an advertisement for NOALOX® Compounds.

Sheet titled General–Test and Control Conductors–Insulated Conductor Stripping, dated Nov. 1983.

* cited by examiner

WIRE JUNCTION ENCAPSULATING WIRE CONNECTOR AND METHOD OF MAKING SAME

Matter enclosed in heavy brackets [ ] appears in the original patent but forms no part of this reissue specification; matter printed in italics indicates the additions made by reissue.

CROSS REFERENCE TO RELATED APPLICATIONS

[This application is a continuation-in-part of patent application Ser. No. 574,808 filed Aug. 30, 1990 titled Waterproof Wire Connector now U.S. Pat. No. 5,113,037 which is a continuation in part of patent application Ser. No. 478,687 filed Feb. 12, 1990 titled Waterproof Wire Connector now U.S. Pat. No. 5,023,402 which is a continuation-in-part of Ser. No. 450,156 filed Dec. 13, 1989, titled Waterproof Wire Connector now abandoned.]

*This application is a continuation of application No. 08/421,810 filed on Apr. 11, 1995, now abandoned, which is a continuation of application No. 08/001,137 filed on Jan. 6, 1993, now abandoned, which is a reissue of application No. 07/673,792 filed on Mar. 22, 1991, now U.S. Pat. No. 5,151,239, which is a continuation-in-part of application No. 07/574,808 filed on Aug. 30, 1990, now U.S. Pat. No. 5,113,037, which is a continuation-in-part of application No. 07/478,687 filed on Feb. 12, 1990, now U.S. Pat. No. 5,023,402, which is a continuation-in-part of application No. 07/450,156 filed on Dec. 13, 1989, now abandoned.*

FIELD OF THE INVENTION

This invention relates generally to a solderless twist on wire connector and a method of making a solderless twist on wire connector and, more specifically, to making a wire junction encapsulating twist on wire connector by securing a prior art twist on wire connector in a shell to produce a wire junction encapsulating twist on wire connector that can in one operation permit the user to simultaneously compress the junction ends of electrical wires into low resistance electrical contact while encapsulating the junction ends of the electrical wires in a solderless substance.

BACKGROUND OF THE INVENTION

The concept of twist on wire connectors for connecting the junction of two or more wires together by twisting a cap on the wires is old in the art. Twist on wire connectors are well known in the art and generally comprise an outer housing with a tapered threaded interior to permit a user to insert wires into the tapered opening. Typical examples of prior art twist on wire connectors are shown in U.S. Pat. Nos. 3,497,607; 3,875,324; and 4,691,079. To use a twist on wire connector, the user inserts the twisted ends of electrical wires into a cavity on the inside of the twist on wire connector. The user then holds the wire in one hand and with the other hand twists the twist on wire connector. The twisting action pulls the junction ends of the wires into a low resistance electrical contact.

If the connector is located in a wet location it is necessary to place a waterproof sealant around the connector. In order to prevent water or moisture from entering the connector and forming an oxidation layer over the ends of the wire the user inserts the twist on wire connector and the wire into some type of a waterproof potting compound. The compound may be either a non hardening or a hardening compound. In either case the compound creates a waterproof capsule over the twist on wire connector and the junction ends of the electrical wires.

Still other wire connectors permit simultaneously forming an electrical connection while the unstrapped electrical leads are located in a sealant by pushing a knife like member through the insulation on the electrical lead to make contact with the electrical wire beneath the insulation. Such wire connectors use separate compartments to hold each unstripped and require the connector to form the sole connection between separate wires and thus may not form a good electrical connection unless firm electrical contact is made between the knife like members and the electrical lead.

The present invention provides an improved twist on wire connector that permits the user in one continuous action to simultaneously form the junction ends of stripped wire leads into a low resistance electrical connection while the stripped electrical leads are surrounded by an encapsulating agents such as a waterproof sealant to form a waterproof covering around the junction ends of the wire leads.

The process of making a prior art twist on wire connector typically involves molding a shell around a spiral coil to create a prior art twist on wire connector. The present invention includes a second molding step wherein the prior art twist on wire connector is placed in a mold and a second shell is molded around the prior art twist on wire connector to produce a wire junction encapsulating twist on wire connector having a chamber that can contain an encapsulating material so that in one operation can permit the user to simultaneously compress the junction ends of electrical wires into low resistance electrical contact with each other while simultaneously encapsulating the junction ends of the electrical wires in a sealant.

DESCRIPTION OF THE PRIOR ART

The Viersen U.S. Pat. No. 1,297,614 shows a process where twisted wire ends are potted in a solder.

The Nicolazzo U.S. Pat. No. 2,416,943 shows a wire connector that squeezes the ends of the wires between an outer housing and an inner housing.

The Bird U.S. Pat. No. 3,083,260 shows a cup shaped body that has a metal cement or putty located around the twisted ends of two electrical leads.

The Swanson U.S. Pat. No. 3,497,607 shows a wire connector that has a spring in the cavity of the connector that cuts through the insulation on the wires.

The Smith U.S. Pat. No. 4,039,742 shows a waterproof splice that uses an enclosed tube containing a sealant that covers the electrical connection between the wires.

The Erixon U.S. Pat. No. 4,107,453 shows a wire connector with an inner and an outer housing with the ends of the wires located between the inner and the outer housing. Twisting the outer housing while holding the inner housing twists the wires into electrical contact.

The Dauser U.S. Pat. Nos. 4,295,004 and 4,446,332 show a solderless wire connector where a cap is squeezed over the ends of the wires to provide an electrical connection.

The Eaton U.S. Pat. No. 4,751,350 shows a cap containing a sealant and retentions to engage the end of a wire inserted into the cap to provide a sealing device around the end of the wire.

The Ustin U.S. Pat. No. 2,870,239 shows a wire connector with a splice cap that is permanently crimped to the conductors to hold the conductors in mechanical and electrical contact.

The Vogel U.S. Pat. No. 3,109,051 shows an electrical wire connector that includes parallel spaced surfaces to insert the ends of the twisted wires in.

The Krup U.S. Pat. No. 3,483,310 shows a connector that has a sleeve that contracts to prevent the sleeve from being withdrawn from the connector.

The Anderson U.S. Pat. No. 3,550,765 shows a sleeve that contains a viscous or flowable substance such as an uncured cement that is hardened to hold the electrical leads in the connector.

The Waddington U.S. Pat. No. 3,875,324 shows a wire connector with a tapered spring located in the connector.

The Caviar U.S. Pat. No. 4,491,686 shows an electrical connector with coverings that can be pierced by inserting a sharply pointed object. A potting compound is then placed around the wires.

The U.S. Pat. No. 4,691,079 shows a screw on wire connector with a shell that is easier to manufacture.

The Netherlands patent 56183 shows a hook on the side of some type of a connector.

The Bumpsted U.S. Pat. No. 3,937,870 shows a connector including a potting cement to cement the wires in a solid mass.

The Penfield U.S. Pat. No. 3,597,528 shows an an electrical wire connector with an insertable plastic plug that contains a plastic bonding agent.

The Smith U.S. Pat. No. 3,934,076 shows an electrical connector with a pre filled and premixed sealant for encapsulating the end of the wires.

The Smith U.S. Pat. No. 4,314,094 shows a container for spliced cables.

The Smith U.S. Pat. No. 4,053,704 shows a key for forming an enclosure for two or more wire cables together.

SUMMARY OF THE INVENTION

Briefly, the present invention comprises an improvement to the method of making a wire junction encapsulating twist on wire connector by securing a prior art twist on wire connector within a housing to create a chamber to hold a sealant in the wire junction encapsulating twist on wire connector.

In one embodiment the user inserts the twisted stripped bare ends of wires through an end cap into the sealant in the wire junction encapsulating twist on wire connector. While holding the wires the user twists the wire junction encapsulating twist on wire connector to simultaneously form an electrical connection between the wires and to place an encapsulating coating such as waterproof and/or spark inhibiting coating over the twisted electrical leads to produce a waterproof and/or fire retardant twist on wire connector. In another embodiment the end cap comprises a puncturable member so a user can insert the twisted junction ends of electrical leads through the puncturable end cap and into the twist on wire connector.

In another embodiment the wire junction encapsulating twist on wire connector includes two chambers for insitu formation of a solidified coating over the junction of the electrical leads located in the wire junction encapsulating twist on wire connector.

DESCRIPTION OF THE PREFERRED EMBODIMENT

Figure 1:
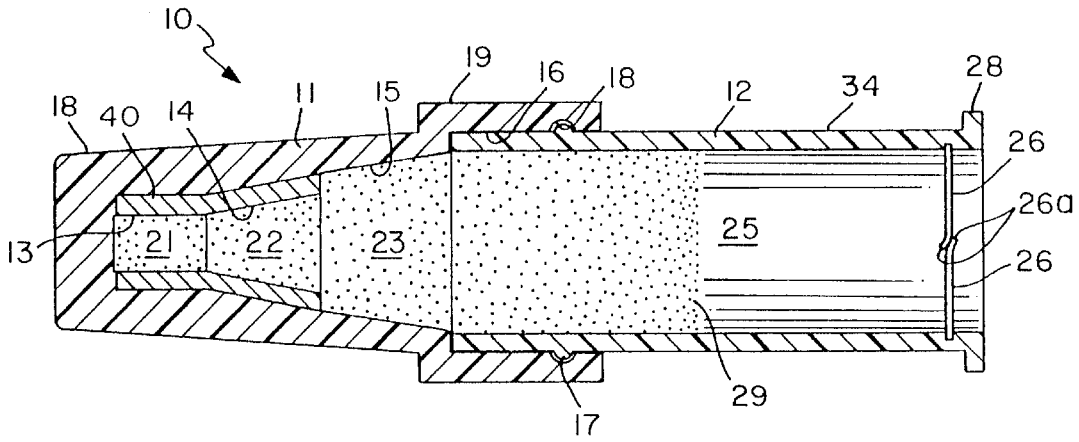
FIG. 1 shows a cross sectional view of a wire connector.

Referring to FIG. 1 reference numeral 10 generally identifies a waterproof and fire retardant twist on wire connector for simultaneously forming a waterproof, spark inhibiting, low resistance electrical connection between the junction ends of electrical leads. Twist on wire connector 10 includes a general cylindrical electrical insulated housing 11 having a cylindrical opening 16 for rotatively engaging an end cap comprising a closed end cylindrical tube or sleeve 12. Located on the closed end of housing 11 is an electrical conducting collar 40 having a first cylindrical interior surface 13 and a converging or tapered wire coil forming a spiral surface 14. The drawing shows collar 40 as a one-piece wire coil, however if desired collar 40 could be made in two pieces. Collar 40 is rigidly mounted in housing 11 so that one can twist housing 11 and collar 40 about the twisted ends of electrical leads to provide a low resistance electrical connection therebetween. Housing 11 is virtually identical to existing twist on wire connectors except for a cylindrical surface 16 to rotatively support a sleeve 12 and an annular opening 18 located in the cylindrical surface 16 to prevent axial displacement of sleeve 12 in housing 18. While the connector is shown with an electrical conducting collar 40 having a wire coil forming a spiral surface in some applications the wire coil is replaced with a nonconducting collar having a surface for twisting on electrical leads.

Rotatively connected to the open end of housing 11 is cylindrical tube or sleeve 12. The cylindrical tube 12 has an exterior cylindrical surface 34 with an annular cylindrical retaining bead 17 extending radially outward from tube 12. Locate interior cylindrical surface 16 of housing 11 is a cylindrical recess 18 that extends completely around surface 16. The bead 17 engages cylindrical recess 18 to prevent axial withdrawal of tube 12 from housing 11 but permits rotational movement of housing 11 with respect to sleeve 12. While bead 17 is shown as annular, bead 17 need only be sufficiently long so as to hold end cap 12 in rotatable position in twist on wire connector 11. The cylindrical surface 34 engages a portion of cylindrical recess 16 in a close mating relationship that provides a tortuous path for escape of sealant. That is, the annular path between the two surfaces and the combination of a bead 17 and annular recess 18 effectively prevent the sealant from leaking out of my connector during storage and handling.

Waterproof and fire retardant connector 10 includes interior compartments 21, 22, 23, and 25 that are partially filled with a viscous sealant 29. Typically sealant 29 can be a silicone base material or the like, a potting compound, greases, or any other waterproofing and fire retardant compounds. A viscous sealant that remains in the connector due to its inherent non-flowability is preferred since the sealant will not run out when the waterproof twist on wire connectors are stored for use or during use. However, other materials could also be used, for example potting compounds that set after exposure to the air. Typical of materials for use with the invention are waterproof and fire retardant greases, potting compounds, or the like. A typical commercially available sealant is CONTAX which is an oxide inhibiting compound sold by Blackburn.

Figure 5:
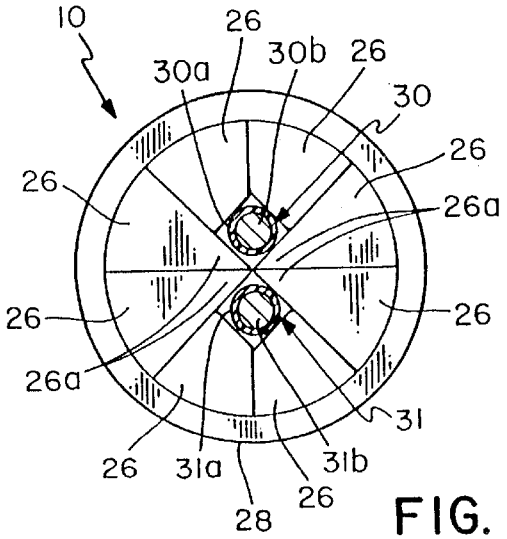
FIG. 5 is an end view of a waterproof and fire retardant connector taken along lines 5 of FIG. 4.

Not only is the sealant useful in preventing the electrical leads from oxidation which results in a poor electrical connection, but it also helps to keep the wires from working loose in the twist on wire connector. In addition, the sealant is also useful in inhibiting sparks that could ignite volatile gases and other flammable material since the sealant encapsulates the exposed portions of the electrical leads. Located on the end of tube 12 is a flexure cover that comprises a plurality of pie shaped resilient segments 26 that converge toward the pointed end 26a of the segments (FIG. 5). The segments slightly overlap each other to form a closure to hold sealant 29 within connector 10 during the handling and transportation of the waterproof connectors. Prior to use the waterproof and fire retardant connectors are loosely stored in a box. With the end of the tube covered by the overlapping segements it prevents one from accidently getting the sealant onto other connectors. If one uses a waterproof sealant that sets when exposed to the air one could use a continuous member instead of segments 26. With a puncturable member one would pierce the member with the end of the wires as the wire ends are inserted into the tube.

FIG. 5 shows how the segment ends 26 flex inward to permit the wires 30 and 31 to be inserted into the waterproof connector. Thus the segments permit a wire to be inserted therethrough while at the same time flexing into a position to close off and seal around the wires.

Figure 3:
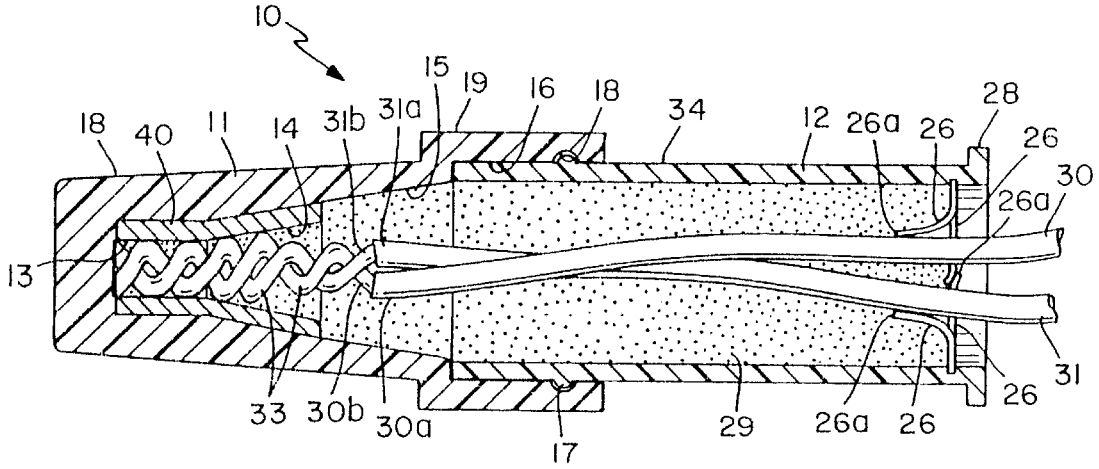
FIG. 3 shows a cross sectional view of the wire connector of FIG. 1 with the junction ends of two wire leads twisted into the cavity in the connector.

When one inserts a twisted wire pair into the cylindrical tube the resilient segments 26 flex inward around the wire to permit the wire to be inserted into the cylindrical cavity 21 while also providing a self forming opening that automatically conforms to the size and shape of the electrical wires. As FIG. 3 illustrates sealant 29 expands to fill the cavity as the wires are inserted into the connector and displace sealant 29.

Figure 2:
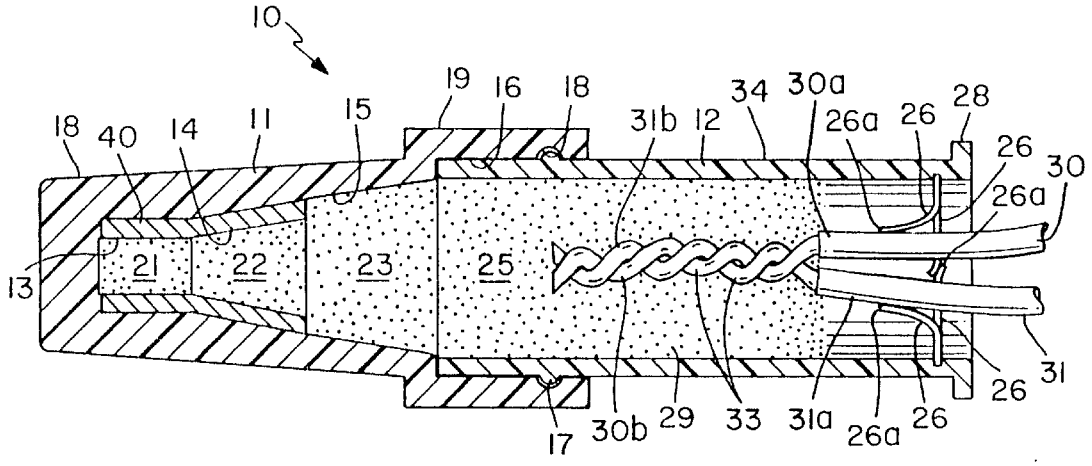
FIG. 2 shows a cross sectional view of the wire connector of FIG. 1 with the junction ends of two wire leads partially inserted into a connector.
Figure 4:
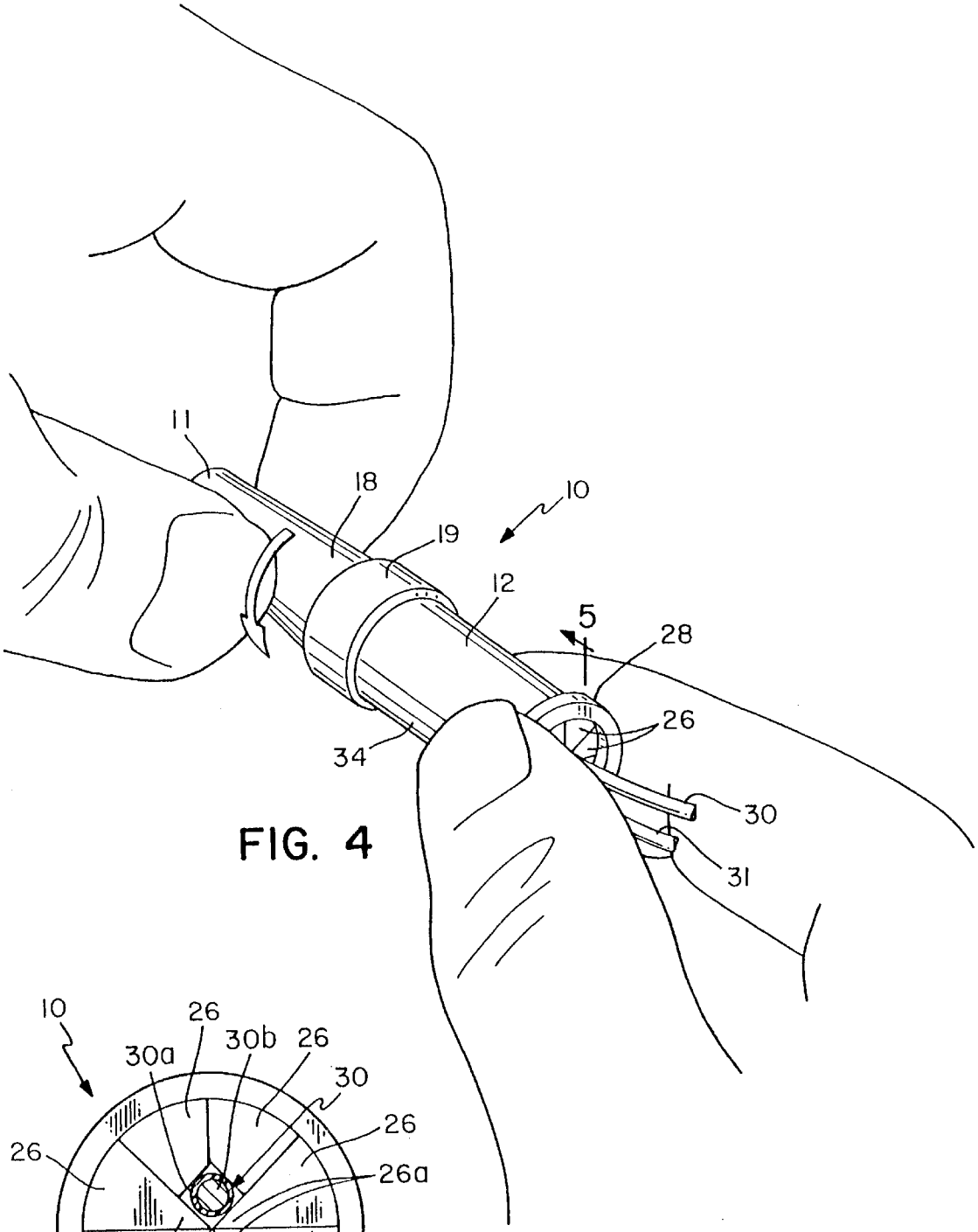
FIG. 4 shows a user rotating one end of a waterproof wire connector while holding the other end stationary.

In order to understand the operation of the invention reference should be made to FIG. 2. FIG. 3 and FIG. 4. FIG. 2 shows an installer inserting a twisted junction 33 formed from wires 30 and 31 into the sealant filled cavity 25. Wire 30 has an electrical insulating covering 30a surrounding a metal wire 30b. Similarly, wire 31 has an electrical insulating covering 31a surrounding metal wire 31b. FIG. 3 shows the wire junction inserted into the cavity 21 with the twisted wire junction 33 contacting the inside surface 13 of collar 40.

FIG. 4 illustrates how a user can simultaneously form a waterproof, spark inhibiting, low resistance electrical connection between the electrical leads with the waterproof connector. To simultaneously form the electrical connection and the waterproof and spark inhibiting covering the operator grasps wires 30 and 31 and the outside surface 34 of tube 12 in one hand and axially inserts the twisted ends of wires 30 and 31 into the chambers 21 and 22 of housing 11. Once the junction ends of the wires are inserted into chambers 21 and 22 the installer takes the other hand and grasps exterior surface 19 on housing 11. The installer then rotates housing 11 while holding the wires and the sleeve to firmly twist the wire junction 33 into contact with the metal collar 40. At the same time the viscous sealant 29 located in the interior cavities 21, 22, 23, and 25 forms a waterproof and spark inhibiting protective covering over junction end 33 of wires to make the connector both waterproof and fire retardant. The use of the sealant in conjunction with a twist on connector permits the installer to simultaneously connect and seal the junction in housing 11 to prevent water and moisture from entering housing 11 which could cause oxidation of the wires resulting in a poor electrical connection. Although the sealant is present in cavities 21 and 22 it has been found that the sealant does not prevent one from rotating housing 11 to twist the junction ends of electrical leads into a low resistance electrical connection.

Figure 11:
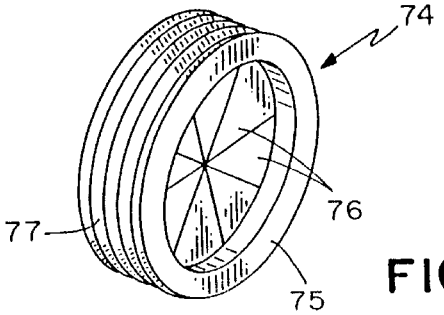
FIG. 11 shows a perspective view of the end cap of the wire connector of FIG. 9.

In the embodiment of FIG. 11 show sleeve 12 rotatively connected to twist on wire connector 11. In certain embodiments one could fixedly connect sleeve 12 to twist on wire connector 11. For example if the sealant was flowable it would flow around the wires as the sleeve is rotated about the wires. If the sealant is flowable one could use a flowable air hardened material such as an epoxy to form the waterproof covering over the twisted ends in the twist on wire connector. In order to maintain the sealant within the rigid connector one can use segments with a spiral configuration that will flex laterally and inwardly around the wire as the twist on wire connector is rotated. Another variation of my invention is to have the flexible segments that permit the end seal to rotate with respect to the sleeve. For example, flexure segments 26 could have an annular base region 28 that is rotatably mounted in an annular recess in sleeve 12.

Figure 6:
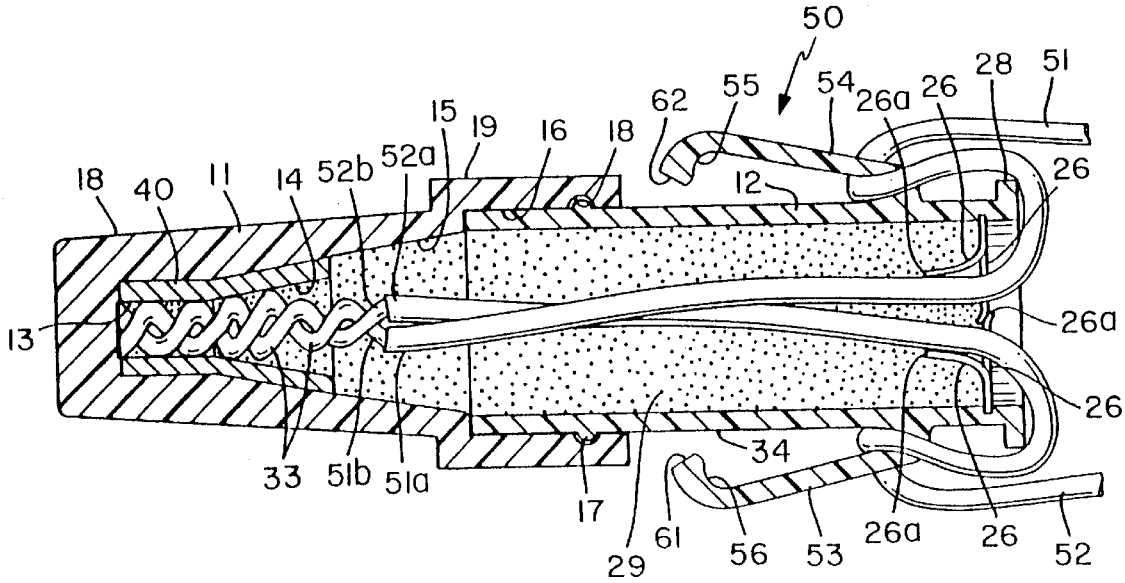
FIG. 6 shows a cross sectional view of another embodiment of the invention.

Referring to FIG. 6 an alternate embodiment of the invention is shown with reference numeral 50 identifying the invention. Connector 50 is identical to connector 10 except the connector 50 includes a first resilient wire clip 54 located on one side of housing 12 and an identical resilient wire clip 53 located on the opposite side of housing 12. Identical parts in FIG. 6 and FIGS. 1–5 and are identified with identical numbers. Resilient clip 54 compress a forward extending member that has a curved section 55 terminating in an end 62 that is slightly angled to permit sliding a wire between clip 55 and surface 34. Likewise clip 53 includes a curved surface 56 and an angled end 61.

FIG. 6 illustrates that wire 51 extends through opening in the end of sleeve 12 and around clip 54 and then back in the same direction. The purpose of clip 54 is to ensure that the wire 51 is not accidentally pulled out of twist on wire connector 11 during handling of the wires. FIG. 6 also illustrates that wire 52 extends through opening in the end of sleeve 12 and around clip 53 and then back in the same direction. Likewise the purpose of clip 53 is to ensure that the wire 52 is not accidentally pulled out of twist on wire connector 11 during the handling of the wires. While only two wires are shown in my invention one can use either of the inventions with either one wire or with multiple wires. Also although two clips are shown one clip is sufficient to hold two or more wires from accidentally being pulled out of housing 12.

Figure 8:
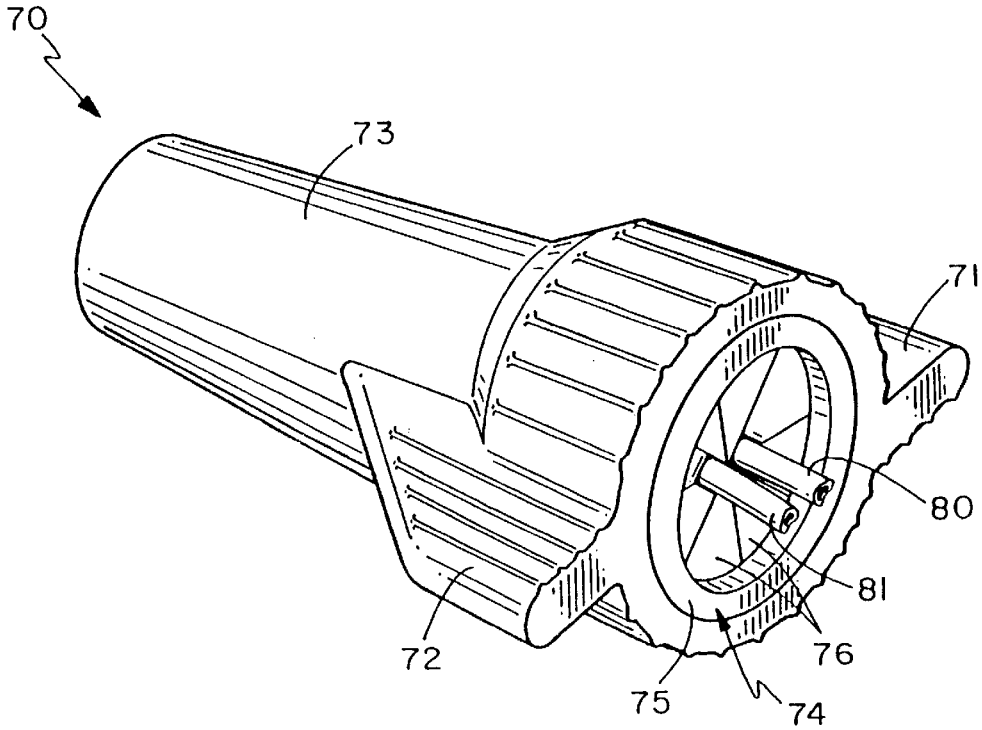
FIG. 8 shows a pictorial view of the wire connector of FIG. 7.

Referring to FIG. 8 reference numeral 70 identifies a twist on wire connector having a cylindrical tapered body or housing 73 with a first flange 71 and a second flange 72. Extending outward form twist on wire connector 70 are a first wire 80 and a second wire 81. The purposes of the flanges are to provide better gripping surfaces to enable a user to twist a twist on wire connector around a pair of twisted wires such as wires 80 and 81.

Figure 7:
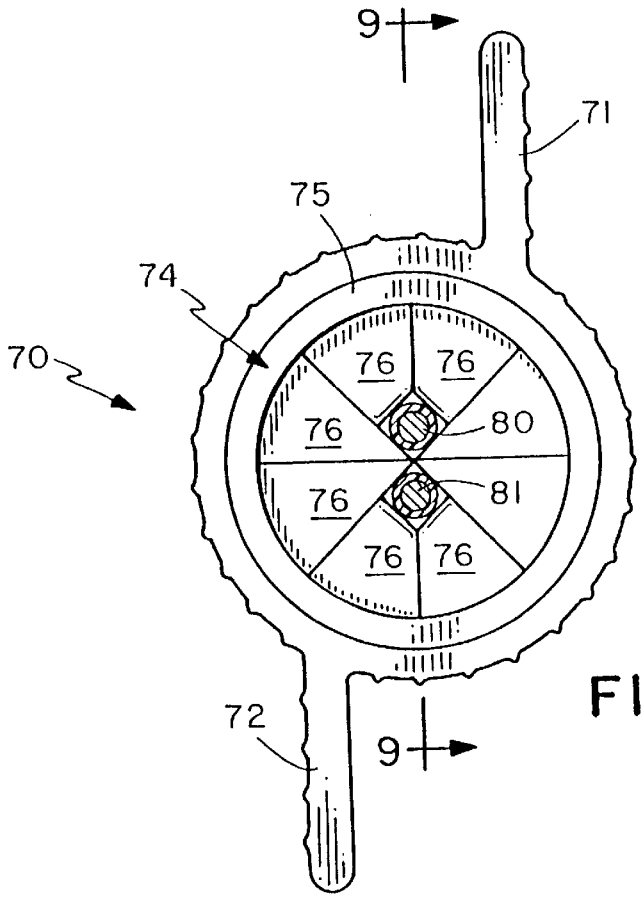
FIG. 7 shows an end view of an alternate embodiment of the invention.

FIG. 7 shows an end view of the twist on wire connector 70 with the end cap comprising a cylindrical threaded insert 74 for holding the waterproof sealant within twist on wire connector 70. End cap 74 comprises an outer support ring 75 with a plurality of flexible pie shaped segments 76 extending in an overlapping arrangement toward the center of the end cap 74 to provide a flexure cover closure to the end cap of twist on wire connector 70.

FIG. 11 shows end cap 74 in a pictorial view revealing annular support ring 77 containing male threads 77 for engaging with female threads located on the inside of a conventional twist on wire connector. The flexible segments are identified by reference numeral 76.

Figure 9:
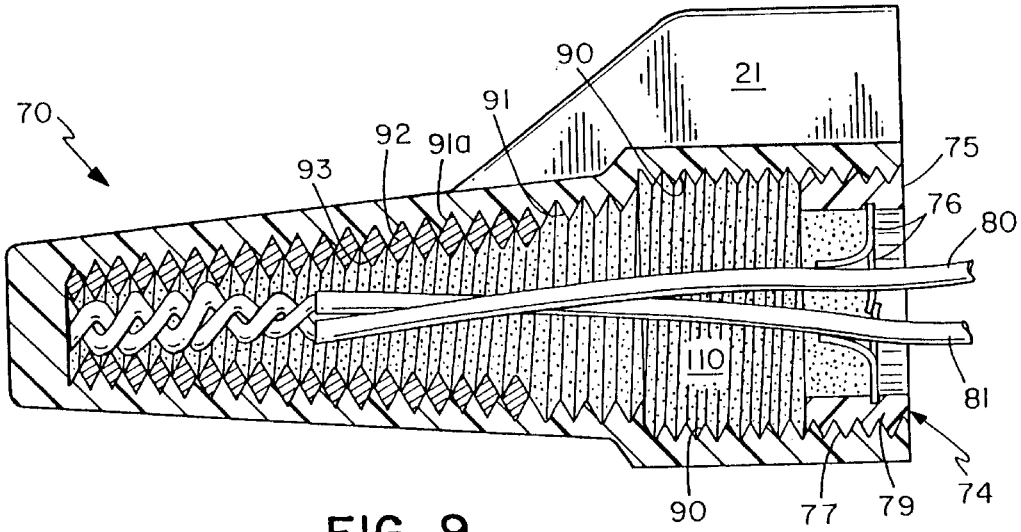
FIG. 9 shows a cross sectional view of the wire connector of FIG. 7 taken along lines A—A of FIG. 7.

FIG. 9 illustrates end cap 74 located in the end portion of twist on wire connector 70. Twist on wire connector 70 includes a first set of conical female threads 91 for engaging conical male threads 91a on the outside of a metal insert 92 and conical shaped female threads 93 on the inside for engaging electrical leads. Located in contact with insert 92 are the twisted ends of wires 80 and 81. Wires 80 and 81 extend through the flexible segments 76 which flex around the wires to form a barrier to prevent the sealant 110 in twist on wire connector 70 from flowing out the end of the twist on wire connector 70. Depending on the frictional resistance between female threads 90 and male threads 77, insert 74 may or may not rotate as the user twists the twist on wire connector about the ends of electrical leads 80 and 81. In either case the resilient flexible segments retain the sealant in the connector.

The advantage of end cap 74 is that one can quickly convert a standard twist on wire connector with an internal female thread into the present invention of a water resistant twist on wire connector by merely screwing insert 74 into the female threads 90 located on the inside of twist on wire connector 70. Alterantly one could make a longer wire nut to hold more sealant. If the resilient flexible segments 76 are sufficiently flexible one can hold wires 80 and 81 in one hand and rotate twist on wire connector 70 about the wires. The resilient flexible segments 76 not only flex inward but also flex sideways as the twist on wire connector 70 and end cap 74 are rotated about the stationary wires to hold the sealant in the twist on wire connector as the wires are twisted into electrical contact with the metal insert 92 in twist on wire connector 70 Typically, flexible segments can be made from a polymer plastic or the like.

Figure 10:
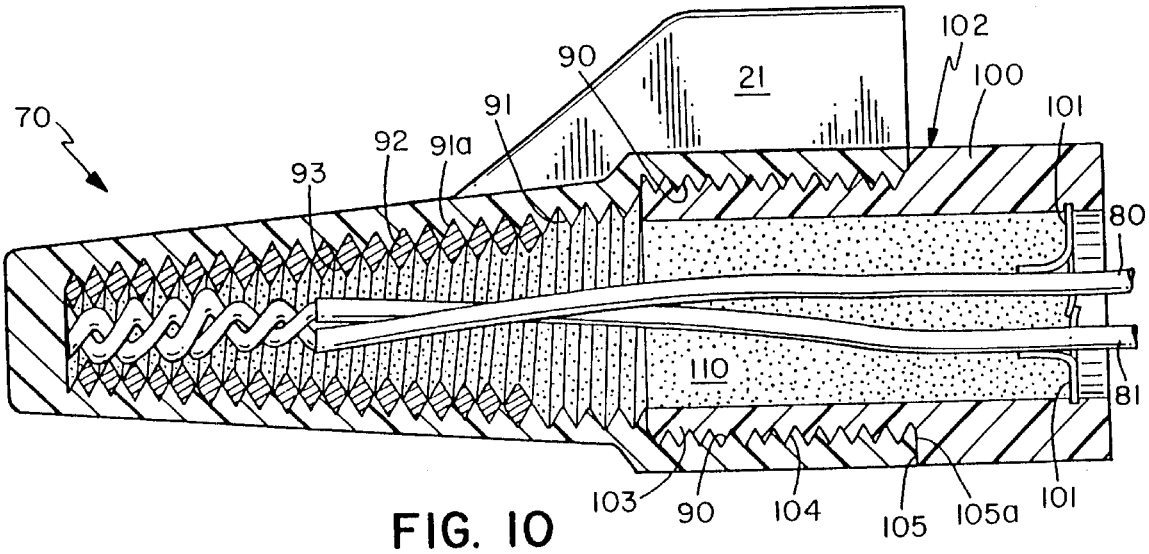
FIG. 10 shows a further alternate embodiment of an end cap in a wire connector.

FIG. 10 shows an alternate embodiment wherein the end cap comprises a non-rotateable insert 102 that contains an extended cylindrical section or sleeve 100 that projects outward beyond the end of twist on wire connector 70. The advantage of twist on wire connector connector of FIG. 10 is that more sealant 110 can be located in the twist on wire connector sleeve 102. End cap 102 includes a first end 103 having male threads 104 for engaging the female threads 90 in twist on wire connector 70. In practice some of the excess sealant may be force out of the connector during the application process. The end of twist on wire connector 70 includes a shoulder 105 for abutting and securing connector 70 against an annular surface 105a on end cap 102. The advantage of the embodiment of FIG. 9 is that a conventional twist on wire connector can be converted into a water proof connector with a reservoir of sealant for ensuring that the twisted bare ends of the electrical connections remain covered with the sealant. While end cap 74 is shown as being threaded into connector 70 other means of fastening such as adhesives or mechanical interlocks could be used to fasten the end cap to the connector to produce a compartment for holing a sealant.

Although end cap 74 is shown fitting on the interior of twist on wire connector 70 end cap 74 could be adapted to include an external collar to permit the end cap to fasten to the exterior of the twist on wire connector rather than the interior of the twist on wire connector.

With both the embodiments of FIG. 7–11 it is apparent that one can readily adapt a twist on wire connector containing female threads to a closed container for holding an encapsulating materials such as a viscous electrical waterproof material.

While the embodiments shown have been pre-filled with a sealant, one could also use on site selection and injection of sealant into the compartment formed by the end cap and the twist on wire connector. For example, a flexible tube dispenser could be used to inject sealant into the twist on wire connector prior to insertion of the wire leads in the twist on wire connector. That is, in one application a water resistant sealant may be injected and in another a spark inhibiting sealant could be injected. Thus the present invention provides field selection of the sealant to permit the user to meet special needs of the installation.

In certain applications one may not need an end cap to hold the sealant in place. For example, if the sealant sets upon ageing the sealant itself could form it's own cap.

Figure 12:
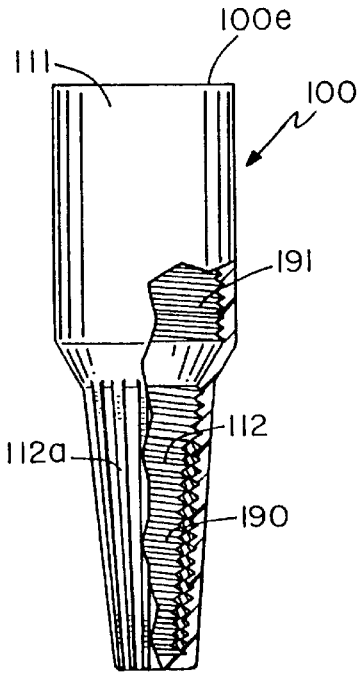
FIG. 12 (PRIOR ART)
FIG. 12 shows a prior art twist on wire connector.

FIG. 12, reference numeral 100, identifies a prior art twist on wire connector that the process of the present invention will encapsulate in a shell. Twist on wire connector 100 contains an internal spiral metal wire core 112, a top portion 111, an upper compartment 191, a lower compartment 190, a set of lower gripping ridges 112 and a top edge 100e. An example of this twist on wire connector is the twist on wire connector manufactured and sold by Ideal Industries, Inc.

Figure 15:
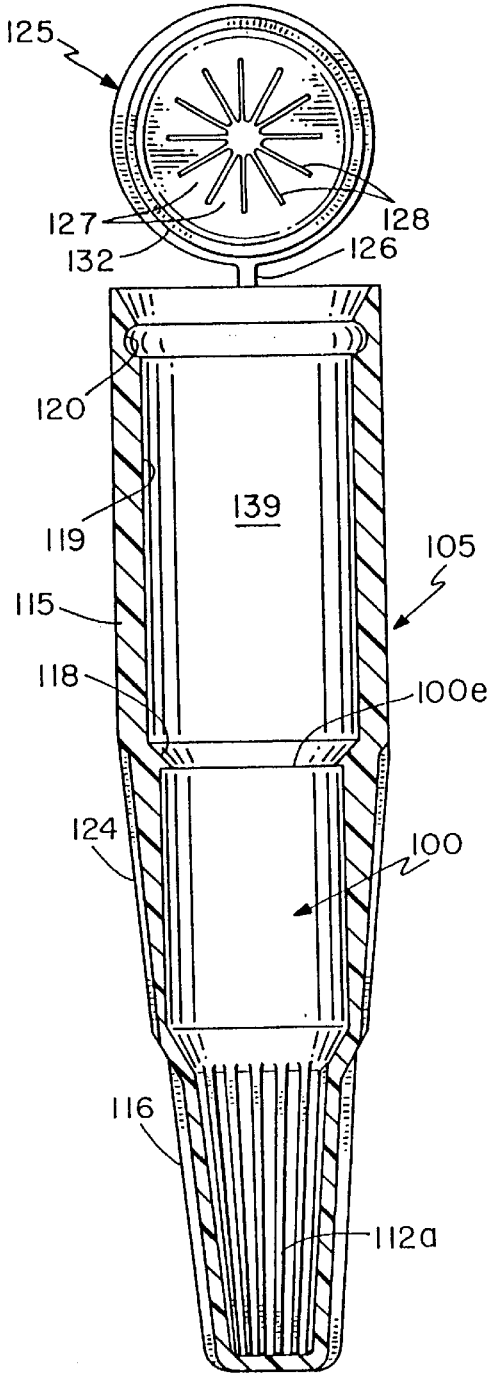
FIG. 15 shows a sectional view of the wire connector with an attached cover.

FIG. 15 shows the twist on wire connector 105 comprising prior art twist on wire connector 100 encapsulated in a cylindrical shell or housing 115 with a cover 125 connected to shell 115 by a living hinge 126. Shell 115 includes an interior region with an upper compartment 139 with an inner surface 119. Located on the outside of shell 115 are gripping ridges 116 and 124. Connected to top portion of shell 115 is cover 125 with flexible segments 127 and aperture slits 128 therein to permit inward flexing of cover 125 when one wants to insert a wire through cover 125.

Figure 14:
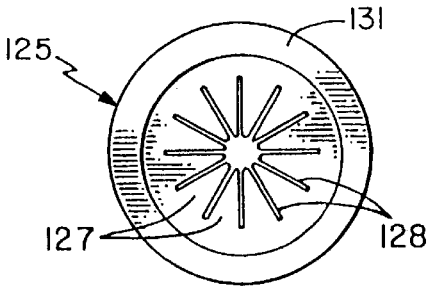
FIG. 14 shows a top view of the wire connector cover of FIG. 13.
Figure 13:
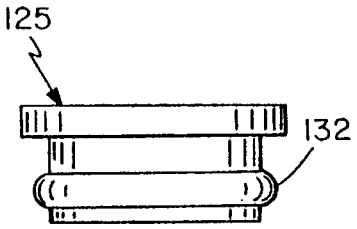
FIG. 13 shows a side view of a closure member for a wire connector.

To show the detail of the cover, refer to FIGS. 13 and 14 which show side and top views, respectively, of cover 125. Cover 125 contains a circular ridge 132 which permits engagement with a mating circular recess 120 on the inside surface 119 of shell 115.

FIG. 15 shows a cylindrical retaining ridge 118 located on the interior or shell 115 which extends around top surface 100e of connector 100 to hold it firmly in shell 115.

Figure 16:
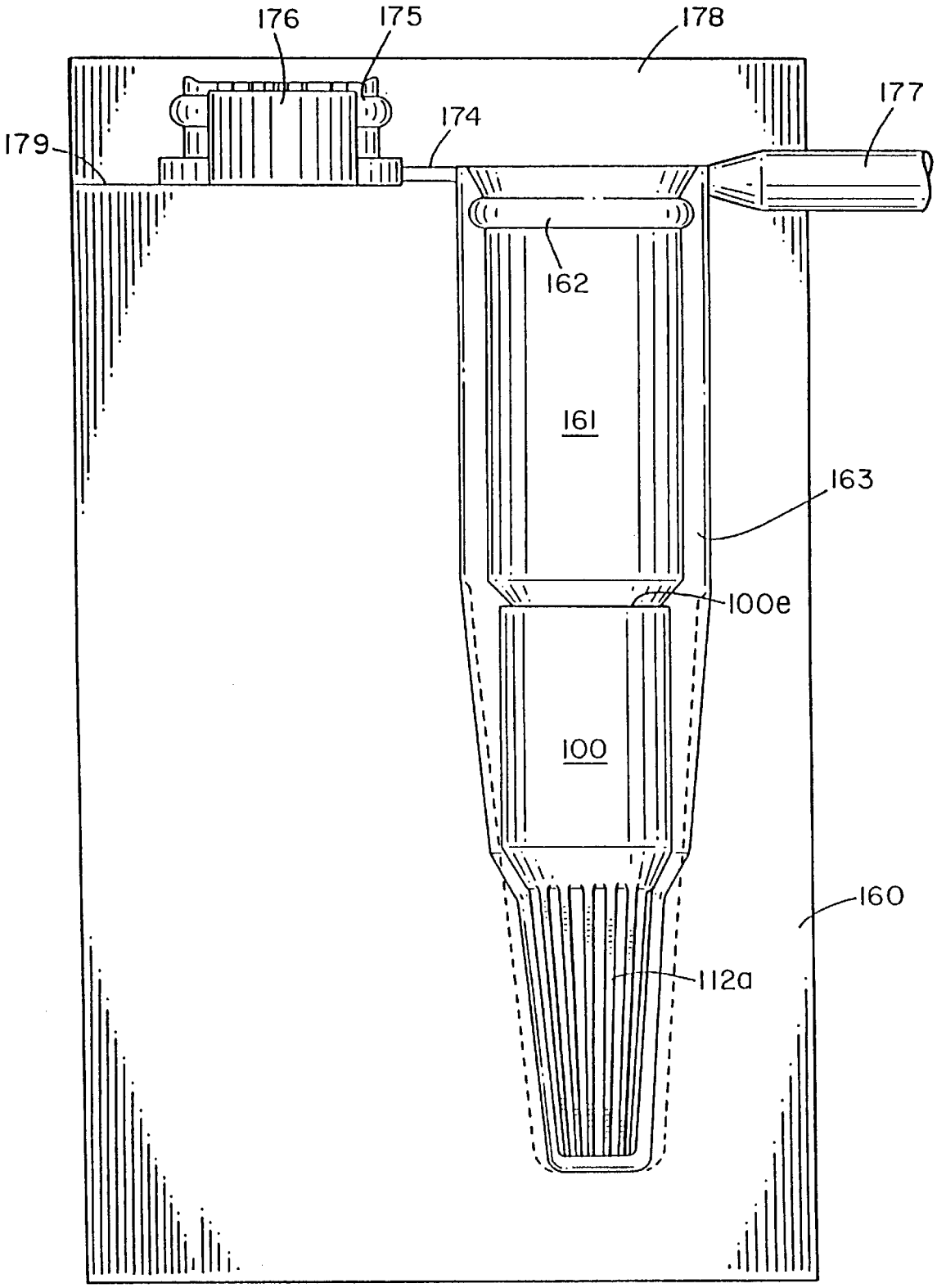
FIG. 16 shows a mold containing a prior art twist on wire connector that is about to be molded into wire junction encapsulating twist on wire connector that can in one operation permit the user to simultaneously compress the junction ends of electrical wires into low resistance electrical contact while encapsulating the stripped junction ends of the electrical wires.

FIG. 16 shows a lower portion of a mold which molds the one piece housing for the wire junction encapsulating twist on wire connector of the present invention. The lower portion of the mold includes a first mold member 160 and a second mold member 178. The mold includes a cylindrical pin 161 with a cylindrical ridge 162 extending laterally. Located on the end of pin 161 is prior art twist on wire connector 100. Note the cylindrical cavity 163 formed between the exterior of pin 161 and twist on wire connector 100. Connected to mold cavity 163 is a cap mold cavity 175 having a pin 176 therein to permit molding of a cap in cap mold cavity 175 and a hinge mold cavity 174 to permit molding of a connecting hinge in hinge mold cavity 174. Tubing 177 allows for injection molding of flowable material such as an electrical insulating plastic like polyethyelene into the cavities formed in mold 160 and 178.

Figure 17:
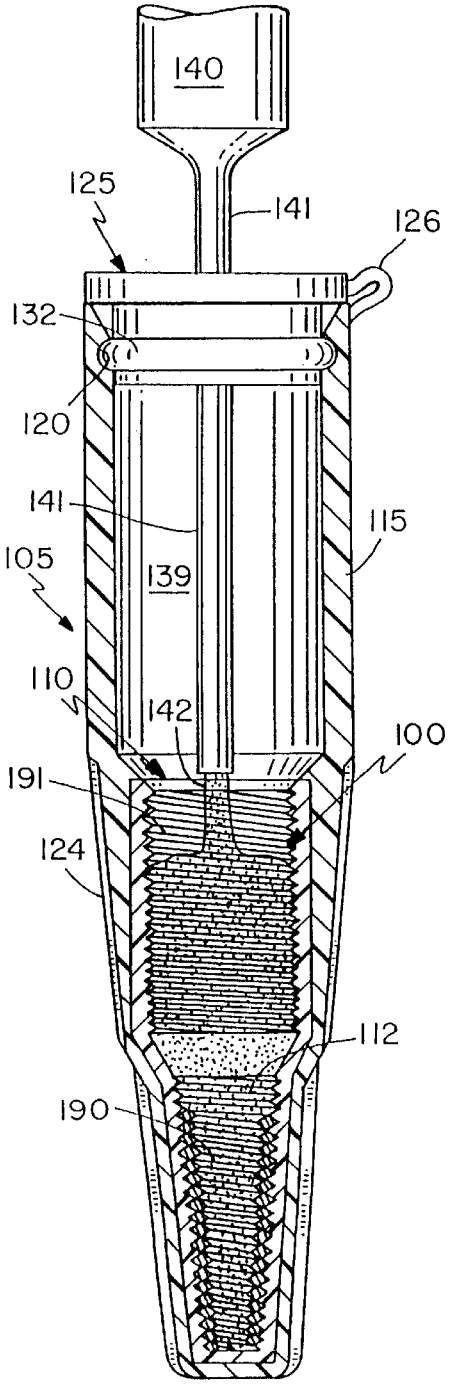
FIG. 17 shows a cross-sectional view of the wire connector of FIG. 15 being filled with a sealant.

To further illustrate the process of making the connector of the present invention with use of a prior art mist on wire connector, refer to FIG. 17 which shows shell 115 with cap 125 located on the end of shell 115 to create a closed interior region or compartment 139 above twist on wire connector 100. A spout 141 connected to a sealant source 140 is inserted through cover 125 to direct sealant material 142 into compartment or chamber 190 formed by the lower region of twist on wire connector 100, i.e., sealant material 142 is flowed into the lower interior region 190 of twist on wire connector 100. In the process of filling a user first inserts spout 141 into the bottom of the interior region 190 of twist on wire connector 100 and moves it upward as the twist on wire connector 100 fills with sealant thus ensuring filling of the twist on wire connector 100 without air bubbles.

A typical sealant for use in the twist on wire connector is Noalox which is sold by Ideal Industries, Inc. and comprises an antioxidant and anti-seizing compound generally comprising a fine zinc particle suspended in a carrier material.

Another suitable sealant material is sold by Witco Corporation under the trademark Lubrimatic and generally comprises a calcium 12-hydroxy sterate grease formulated in NLGI consistency. The sealant is fortified with rust and oxidation inhibitors as well as extreme pressure agents to make the sealant suitable for use at cold temperature as well as to provide water-resistant covering of the end of the electrical wire on the interior of the connector.

Although I have described sealant materials other encapsulating electrically insulating materials could be used with the invention.

Figure 18:
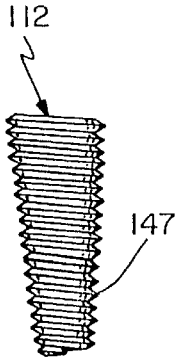
FIG. 18 (PRIOR ART)
FIG. 18 shows the spiral wire core used in the twist on wire connector.

As an alternate embodiment of the method of invention, the invention could be made by encapsulating just the spiral metal coil 112 having inner spiral wire rather than the entire twist on wire connector 100. FIG. 18 shows a typical spiral wire core 112 having outer ridges 147.

Figure 19:
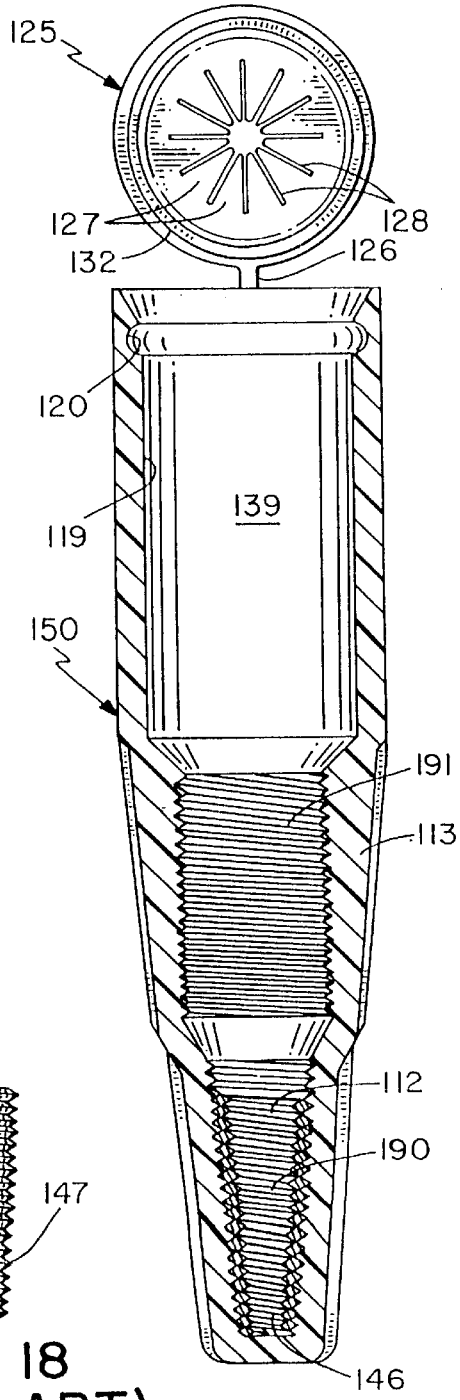
FIG. 19 shows the spiral wire core of FIG. 18 secured in a shell.

FIG. 19 illustrates the alternate embodiment of the invention 150 with wire coil 112 having an inner spiral wire engaging surface 146 encapsulated in a cylindrical shell or housing 113.

Figure 20:
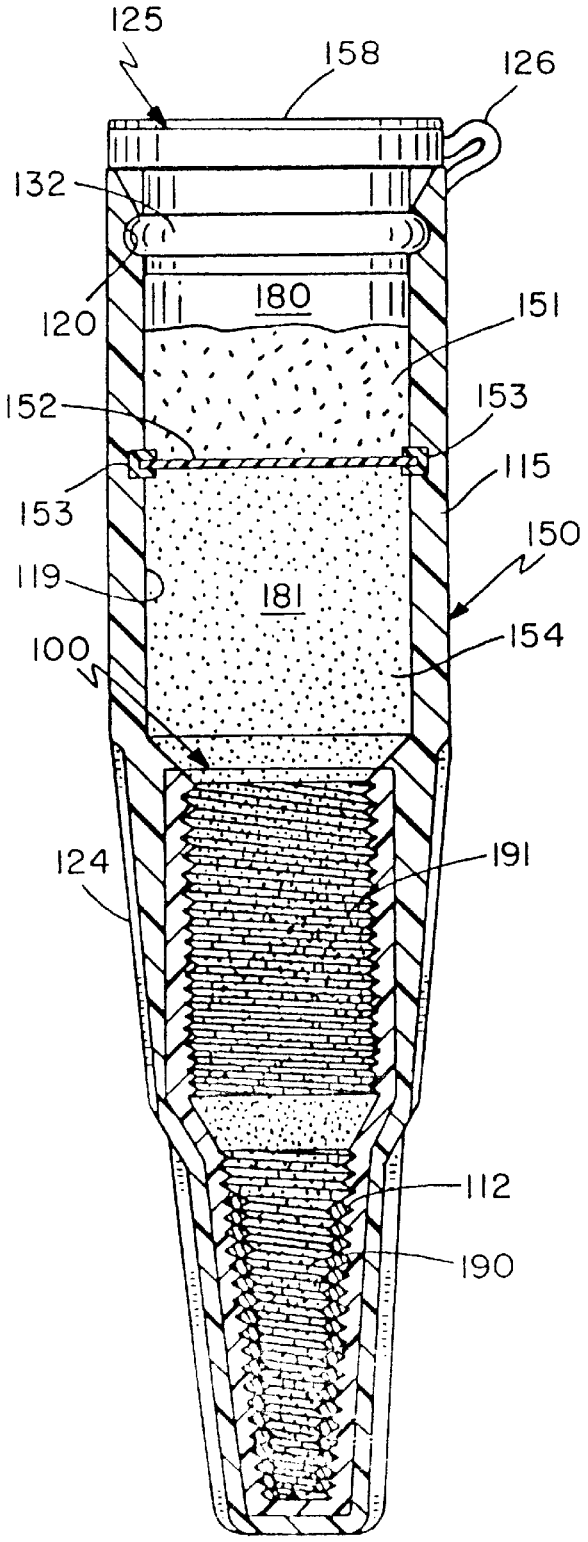
FIG. 20 shows a cross-sectional view of an alternate embodiment of a waterproof twist on wire connector.

FIG. 20 shows a further alternate embodiment 150 of the invention, with two separate chambers or compartments with different materials placed in each compartments in wire junction encapsulating twist on wire connector 150. The embodiment shown in FIG. 20 is identical to embodiment of FIG. 17 except the embodiment of FIG. 20 includes two compartments (upper compartment 180 and lower compartment 181) and a puncturable cylindrical end cap 158. Note, interior wall 119 contains a circular recess 153. Extending in a sealing relation between compartments 180 and 181 is a puncturable cylindrical member 152. Puncturable member 152 and puncturable end cap 158 are made of a flexible, puncturable material such as a thin plastic, cellophane or the like. Located in the lower compartment 181 is a sealing material 154 such as one part material of a two-part epoxy material. Located above member 152 is upper compartment 180 having a sealing material 151 such as one part material of a two-part epoxy material. Located on the top of connector 180 is a puncturable member 158 which typically may be a thin flexible plastic member or the like which is easily penetrable by blunt ends of electrical wires. Puncturable member 158 is shown on top of cap 125 to prevent sealant from accidently spilling out of connector 150. However, puncturable member 125 could in some applications be used as a substitute for cover 125.

To use the unit shown in FIG. 20, an operator inserts the end of an electrical wire through puncturable member 158, puncturable member 152 and into cavity 190 in twist on wire connector 100. The insertion process punctures member 158 and also punctures member 152. Once the wire ends are in connector 150, the user rotates the wire a few times to mix the two-part materials 151 and 154. If the mixed material is a two part epoxy the epoxy then sets to produce a solidified covering over the ends of the wire lead and twist on wire connector 100.

In summary the method of making a wire junction encapsulating twist on wire connector one places a twist on wire engaging coil in a mold. Space is left in the mold so that the one can form a mold cavity around the exterior region of the twist on wire engaging coil. The interior region of the twist on wire engaging coil which has a wire engaging surface for griping and holding the end of an electrical lead is covered in the mold to prevent molding material from flowing into the interior region of the twist on wire connector. Next one injects a a moldable electrical insulating material such as polyethylene into the mold cavity to form a housing around the twist on wire engaging coil. When one removes the solidified housing from the mold the housing has an interior region and an opening with the interior region of the housing proximate the interior region of the twist on wire connecting coil. In the next step one injects an encapsulating materiel such as a sealant into the interior region of the twist on wire engaging coil and the interior region of the housing. Once a sealant is located in the interior region of the twist on wire engaging coil a user can thereafter insert the end of the electrical lead into the sealant and into contact with the wire engaging surface on the interior region of the twist on wire engaging coil. Once assembled a user can use the connector to simultaneously form a gripping engagement between the end of an electrical lead and the wire engaging surface and a sealant covering on the end of the electrical lead. To grip and lock the wire in the connector the user grasps and holds the electrical lead while rotating the housing. Rotating the twist on wire engaging coil causes the wire engaging surface to bite into and grip the end of electrical lead. At the same time sealant covers and encapsulates the end of the electrical lead in contact with the wire engaging surface.

In an alternate embodiment of my invention I incorporate an insecticide into the plastic so that my connectors can be used to kill insects that may be attracted to a junction box containing wire connections. The concept of slow release insecticides in ear tags is known in the art and in the present invention it is contemplated to use the polymer with a slow release insecticide for at least a portion of the exterior shell of the connector.

I claim:

1. A method of making a sealant containing shell around a ready to use twist on wire connector comprising the steps of:

placing a ready to use twist on wire connector having an interior region and an exterior region in a mold to thereby form a mold cavity around the exterior region of the twist on wire connector, the interior region of the twist on wire connector having a wire engaging surface for gripping and holding an electrical lead;

injecting a moldable electrical insulating material into the mold cavity and allowing the moldable material to solidify and to thereby form an electrical insulating shell around the exterior region of the twist on wire connector and a chamber for a sealant; and injecting a sealant into the interior region of the twist on wire connector to thereby form a shell having both a twist on wire connector and a chamber for and a sealant located therein [end] *and* subsequently forming a sealant covering low resistance electrical connection around an electrical lend in the presence of the sealant by inserting electrical leads into the shell and the twist on wire connector, and including the step of grasping and holding the electrical leads in one hand while rotating the shell with the other hand to thereby lock and seal the electrical lead in the twist on wire connector.

2. The method of claim 1 including the step of placing a cap on the shell to form an interior region in the shell for receiving a sealant.

3. The method of claim 1 where the moldable material injected into the cavity is an electrical insulating plastic material.

4. The method of claim 2 where the cap is molded to the shell with a living hinge.

5. The method of claim 4 where the sealant is inserted through an opening in the cap.

6. The method of claim 1 including the step of extending the mold cavity around the exterior region of the twist on wire connector so that the moldable material when solidified forms a retaining ring to lock the twist on wire connector to the shell.

7. The method of claim 1 wherein one places the twist on wire connector having a spiral wire coil in the mold cavity.

8. The method of claim 1 including the step of forming a first sealant cavity proximate the interior region of the twist on wire connector with the first sealant cavity formed to be in fluid communication with the interior region of the shell.

9. The method of claim 1 including the step of forming a first sealant cavity and a second sealant cavity in the interior region of said shell by placing a wire puncturable member in the chamber of the shell.

10. The method of claim 1 including the step of forming a puncturable seal on, the shell to thereby form a leakproof enclosure for a sealant.

11. The method of claim 9 including the step of placing a first material in said first sealant cavity and a second material in said second sealant cavity with the first sealant material operable to harden when mixed with the second sealant material so that when an electrical lead is inserted into said shell and rotated in said shell the rotation of the electrical [leads] *lead* causes the first and second materials to be mixed together thereby permitting the materials to harden and encapsulate the electrical lead in the shell.

12. The method of claim 11 wherein a two part epoxy resin that reacts to harden when the two parts are mixed together with one part of the epoxy resin inserted in the first sealant cavity and the second part inserted in the second sealant cavity so that when an electrical lead extending into said twist on wire connector is rotated it mixes said first part of the epoxy resin and the second part of the epoxy resin to thereby cause said epoxy resin to harden around the electrical leads in said shell.

13. A method of making a sealant containing twist on wire connector comprising the steps of:

placing a twist on wire engaging coil having an exterior region in a mold to thereby form a mold cavity around the exterior region of the twist on wire engaging coil, said wire engaging coil having an interior region with a first chamber having a wire engaging surface for gripping and holding the end of an electrical lead therein;

placing a moldable material into the mold cavity and allowing the moldable material to solidify to form a housing around the twist on wire engaging coil with said housing having an interior region with a second chamber and an opening, said second chamber of said housing proximate the first chamber of the twist on wire connecting coil; and placing a sealant into the first chamber in the interior region of the twist on wire engaging coil and thereafter inserting the end of an electrical lead into the sealant and into contact with the wire engaging surface on the interior region of the twist on wire engaging coil and simultaneously forming gripping and electrical engagement between the electrical lead and the wire engaging surface by grasping and holding the electrical lead while rotating said housing with the twist on wire engaging coil thereby causing the wire engaging surface to bite into and grip the electrical lead to produce a sealant covering over the electrical lead in contact with the wire engaging surface.

*14. A waterproof electrical wire connector, comprising:*

*a. an outer cup made of waterproof material and having a sidewall and a bottom, the sidewall having a top edge, an interior surface and an exterior surface, and the bottom having an upper surface which together with the interior surface of the sidewall define an inner chamber of the outer cup;*

*b. an inner cup completely enclosed in said inner chamber of said outer cup, the inner cup having a generally frusto-conical shaped body made of electrical insulating material and a hollow collar made of electrical conducting material, the generally frusto-conical shaped body having an exterior surface engaged with said interior surface of said sidewall of said outer cup, a bottom engaged with said upper surface of said bottom of said outer cup, and a top having an opening extending into an inner chamber for housing the hollow collar, and the hollow collar having an interior surface;*

*c. means for preventing said inner cup from rotating inside said inner chamber of said outer cup;*

*d. means for preventing said inner cup from sliding longitudinally inside said inner chamber of said outer cup;*

*e. a top cap made of resilient waterproof material and closed on said outer cup, the top cap having a transverse circular flange resting on said top edge of said sidewall of said outer cup, a longitudinal circular lip engaged with said interior surface of said sidewall of said outer cup immediately below said top edge of said sidewall of said outer cup, and a transverse flat cover having at least one central perforation;*

*f. means for interlocking said top cap with said outer cup; and*

*g. a body of viscous waterproof sealant contained inside said inner chamber of said outer cup between said flat cover of said top cap and said inner cup;*

*h. whereby a twisted joint of two respective conducting cores of two electrical wires can be inserted into said inner chamber at said outer cup through said at least one central perforation of said flat cover at said top cap and engaged with said interior surface of said hollow collar of said inner cup which further improves the electrical connection between said two wires, while being protected against corrosion by said body of viscous waterproof sealant which prevents moisture and water from entering into said inner chamber of said outer cup through said at least one central perforation at said flat cover of said top cap.*

*15. The invention as defined in claim 14 wherein said means for preventing said inner up from rotating inside said inner chamber of said outer cup comprises a multiplicity of longitudinal grooves on said exterior surface of said generally frusto-conical shaped body of said inner cup, and a multiplicity of matching longitudinal ribs on said interior surface of said sidewall of said outer cup, where each one of the multiplicity of matching longitudinal ribs on said interior surface of said sidewall of said outer cup is engaged with a respective one of the multiplicity of longitudinal grooves on said exterior surface of said generally frusto-conical shaped body of said inner cup.*

*16. The invention as defined in claim 15 wherein said multiplicity of longitudinal grooves on said exterior surface of said generally frusto-conical shaped body of said inner cup are equally distributed on a 360 degree circle, and said multiplicity of matching longitudinal ribs on said interior surface of said sidewall of said outer cup are also equally distributed on a 360 degree circle.*

*17. The invention as defined in claim 16 wherein there are five said longitudinal grooves on said exterior surface of said generally frusto-conical shaped body of said inner cup and five matching longitudinal ribs on said interior surface of said sidewall of said outer cup.*

*18. The invention as defined in claim 14 wherein said means for preventing said inner cup from sliding longitudinally inside said inner chamber of said outer cup comprises a transverse circular flange protruding from said interior surface of said sidewall of said outer cup and located right above said top of said generally frusto-conical shaped body of said inner cup.*

*19. The invention as defined in claim 14 wherein said means for interlocking said top cap with said outer cup comprises at least one transverse circular groove on said interior surface of said sidewall of said outer cup adjacent to said top edge of said sidewall of said outer cup, and at least one transverse outer circular protrusion at said longitudinal circular lip of said top cap, where said least one transverse outer circular protrusion at said longitudinal circular lip of said top cap is snugly engaged with said at least one transverse circular groove on said interior surface of said sidewall of said outer cup adjacent to said top edge of said sidewall of said outer cap.*

*20. The invention as defined in claim 14 further comprising means for preventing said outer cup from rotating while being held in a user's hand.*

*21. The invention as defined in claim 20 wherein said means for preventing said outer cup from rotating while being held in a user's hand comprises a multiplicity of longitudinal ribs on said exterior surface of said sidewall of said outer cup.*

*22. The invention as defined in claim 21 wherein said multiplicity of longitudinal ribs on said exterior surface of said sidewall of said outer cup are equally distributed on a 360 degree circle.*

*23. The invention as defined in claim 22 wherein there are six said longitudinal ribs on said exterior surface of said sidewall of said outer cup.*

*24. The invention as defined in claim 14 wherein said transverse flat cover of said top cap further comprises a multiplicity of radially disposed narrow perforations.*

*25. The invention as defined in claim 24 wherein said multiplicity of radially disposed narrow perforations on said transverse flat cover of said top cap are equally distributed on a 360 degree circle.*

*26. The invention as defined in claim 25 wherein there are eight said multiplicity of radially disposed narrow perforations on said transverse flat cover of said top cap.*

*27. The invention as defined in claim 14 wherein said waterproof material is plastic.*

*28. The invention as defined in claim 14 wherein said electrical insulating material is plastic.*

*29. The invention as defined in claim 14 wherein said electrical conducting material is metal.*

*30. The invention as defined in claim 14 wherein said body of viscous waterproof sealant is a silicone based thick grease.*

*31. A method of making a sealant containing twist on wire connector comprising the steps of:*

*placing a moldable material into a mold cavity and allowing the moldable material to solidify to form a housing having a first chamber for receiving a twist on wire engaging coil with said housing having an interior region with a second chamber and an opening, said second chamber of said housing proximate the first chamber for receiving a twist on wire engaging coil;*

*placing a twist on wire engaging coil having an exterior region to engage the first chamber for receiving a twist on wire engaging coil, said wire engaging coil having an interior region with a chamber having a wire engaging surface for gripping and holding the end of an electrical lead therein; and*

*placing a sealant into the chamber in the interior region of the twist on wire engaging coil and thereafter inserting the end of an electrical lead into the sealant and into contact with the wire engaging surface on the interior region of the twist on wire engaging coil and simultaneously forming gripping and electrical engagement between the electrical lead and wire engaging surface by grasping and holding the electrical lead while rotating said housing with the twist on wire engaging coil thereby causing the wire engaging surface to bite into and grip the electrical lead to produce a sealant covering over the electrical lead in contact with the wire engaging surface.*

*32. The method of claim 1 including the step of molding a lip on the interior region of said shell to hold said twist on wire connector in said shell.*

*33. The method of claim 1 including the step of molding ridges on the interior region of said shell to hold said twist on wire connector in said shell.*

*34. A method of making a sealant containing twist on wire connector comprising the steps of:*

*placing a moldable material into a mold cavity and allowing the moldable material to solidify to form a housing having a chamber having a wire engaging surface for gripping and holding the end of an electrical lead therein with said housing having an interior region with a second chamber having an opening, said second chamber of said housing proximate the first chamber;*

*placing a sealant into the chamber in the interior region of the twist on wire connector and thereafter inserting the end of an electrical lead into the sealant and into contact with the wire engaging surface on the interior region of the twist on wire connector and simultaneously forming gripping and electrical engagement between the electrical lead and wire engaging surface by grasping and holding the electrical lead while rotating said housing thereby causing the wire engaging surface to bite into and grip the electrical lead to produce a sealant covering over the electrical lead in contact with the wire engaging surface.*

*35. A water resistant electrical connector, comprising:*

*a. an outer housing made of water resistant material and having a sidewall and a bottom, the sidewall having a top edge, an interior surface and an exterior surface, and the bottom having an upper surface which together with the interior surface of the sidewall define an inner chamber of the outer housing;*

*b. an inner wire connector completely enclosed in said inner chamber of said outer housing, means in said outer housing to hold said wire connector inside said inner chamber of said outer housing, the inner wire connector having an inner chamber with an interior surface for engaging a wire, the inner wire connector having a top having an opening extending into the inner chamber of the outer housing; and*

*g. a body of viscous sealant contained inside said inner chamber of said wire connector;*

*h. whereby an electrical wire can be inserted into said body of said viscous sealant in said inner chamber of said wire connector and engaged with said interior surface of said wire connector, while being protected against corrosion by said body of viscous sealant which retards moisture and water from entering into said inner chamber of said wire connector.*

*36. The electrical connector of claim 35 wherein said means to hold said wire connector includes further means to prevent said wire connector from sliding longitudinally inside said inner chamber of said outer housing.*

*37. The electrical connector of claim 35 wherein said means to hold said wire connector includes further means to prevent said wire connector from rotating inside said outer housing.*

* * * * *